March 31, 1942. V. E. HOFFMAN ET AL 2,277,760
FLOW METER
Filed Jan. 6, 1940
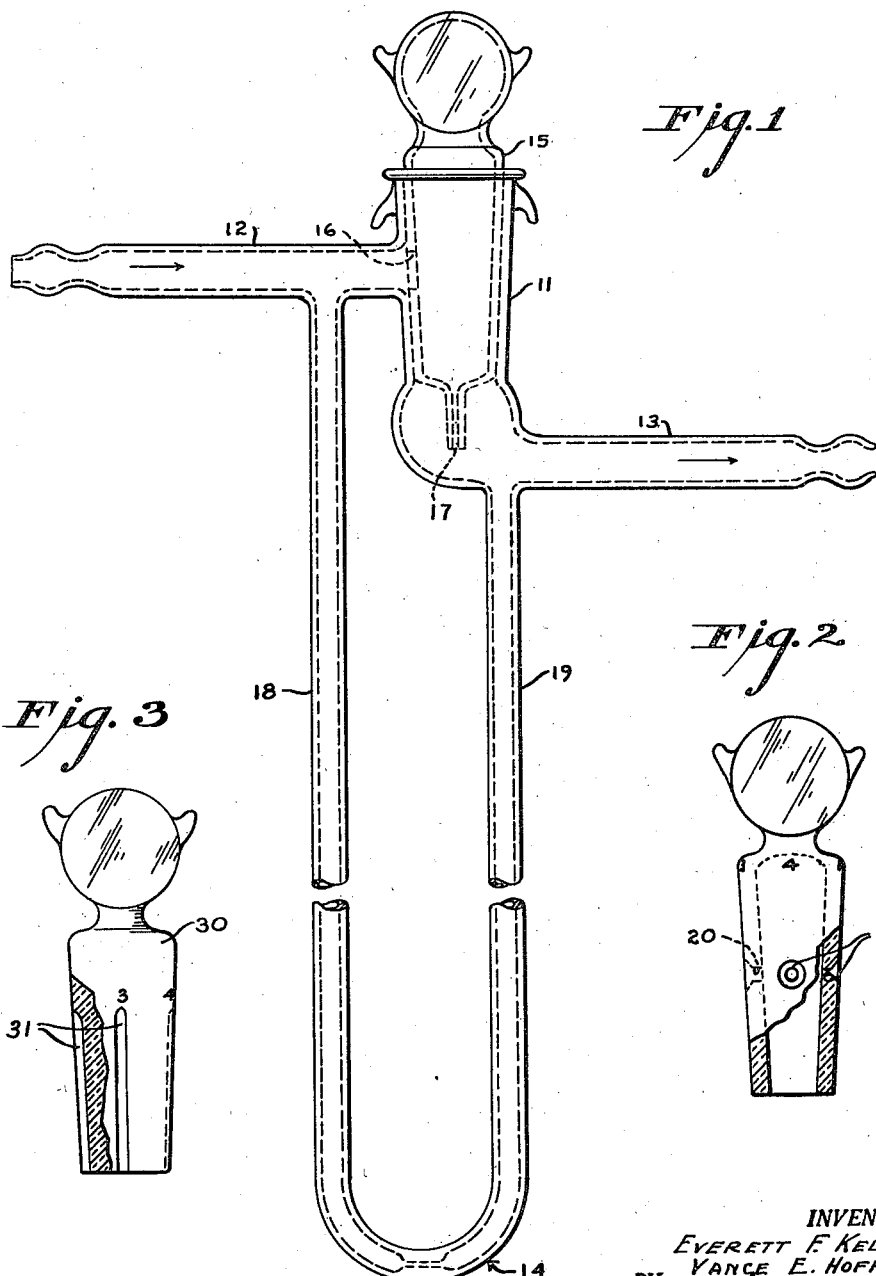
INVENTORS.
EVERETT F. KELM AND
VANCE E. HOFFMAN.
BY
ATTORNEY.

Patented Mar. 31, 1942

2,277,760

UNITED STATES PATENT OFFICE 2,277,760

FLOWMETER

Vance E. Hoffman and Everett F. Kelm, Corning, N. Y., assignors to Corning Glass Works, Corning, N. Y., a corporation of New York Application January 6, 1940, Serial No. 312,743

5 Claims. (Cl. 73—211)

Our invention relates to laboratory apparatus and particularly to an improved form of flow meter.

In one of the past forms of flow meters with which applicants are familiar a disk having a small fluid metering aperture therethrough is arranged between a flanged coupling of a fluid conducting pipe line and the rate of flow determined jointly by the size of the aperture through the disk and the difference in pressure of the fluid on opposite sides thereof.

Such an arrangement is quite satisfactory for a permanent installation where the fluid flow to be measured is within certain limited ranges. For general laboratory work, however, it is often desirable to modify the date of flow without unduly changing the pressure. In the form of construction hereinbefore referred to, the conduit has to be opened up and a different insert placed therein.

An object of the present invention is an improved form of flow meter.

Another object is an all glass flow meter of simple design.

A further object is a flow meter so designed and constructed that the volume of flow for a given pressure can be readily modified.

A still further object is a flow meter capable of measuring a greater range of rates of flow than has been possible by prior forms of flow meters.

Fig. 1 of the accompanying drawing illustrates one form of flow meter assembly embodying our invention;

Fig. 2 illustrates an alternative form of one part of the assembly of Fig. 1; and Fig. 3 is a view similar to Fig. 2 of a further form of our invention.

In Fig. 1 of the drawing the flow meter body comprises a bottle neck portion 11 having laterally extending tubular portions 12 and 13 for connection in a fluid line and having side openings in communication with the ends of a U tube 14 for a liquid employed to indicate the rate of flow. The neck portion 11 is internally tapered and ground to accommodate a hollow stopper and flow restricting member 15. This stopper has a side opening 16 in its wall allowing the free flow of fluid into the stopper from tubular portion 12 of the body and a constricted opening 17 in communication with the tubular portion 13.

In operation, a suitable liquid is introduced into the U tube 14 which will normally stand level in both legs of this tube. When tubular portions 12 and 13 are connected in a fluid supply line, assuming the flow being in the direction indicated, the constricted aperture will cause a predetermined drop in pressure in portion 13, and accordingly this difference in pressure will cause fluid in the leg 18 of U tube 14 to be forced downward and that in leg 19 to be correspondingly raised. With a known size of aperture 17 the volume of flow can thus be determined.

The form of the stopper illustrated in Fig. 1 is only suitable for use when measuring rates of flow within the limited range permitted by aperture 17 and accordingly to measure rates of flow beyond such range requires substitution of a stopper having a different size opening. It is to meet the need for an assembly which can measure a wider range of rates of flow that the stopper illustrated in Fig. 2 has been designed. This stopper has a relatively thick wall and is wide open at the bottom end. The side wall is, on the other hand, provided with a plurality of openings 20 of graduated sizes adapted to be selectively brought into register with the laterally extending tubular portion 12 of neck 11 so that a plurality of ranges or rates of fluid flow can be measured by use of the same stopper and without the necessity of removing it from the flow meter body. As will be observed, the portions of these openings adjacent the neck wall are countersunk to remove any danger of their becoming plugged by lubricant used on the stopper and neck wall surfaces. Also the stopper has aperture size identifying numerals, such as the numeral 4 for example, which when lined up with the tubular portion 12 indicate to an operator the opening being used.

The stopper 30 shown in Fig. 3 is also adapted for substitution for the stopper 15 and has fluid metering passages 31 in permanent communication with the tubular extension 13. These passages extend to a height enabling them to be brought into register with the tubular extension 12. As will be evident by rotation of the stopper, use may be made of any desired passage.

It should be understood that, although in the foregoing description it has been assumed that the direction of fluid flow is from left to right, the instrument functions equally well with the direction of flow reversed. Obviously, if the direction of flow is reversed, the fluid in leg 19 of the U tube will be forced downward and that in leg 18 correspondingly raised, otherwise the operation will be the same as already described.

What is claimed is:

1. In an all glass flow meter, a hollow body having a tapered open end, tubular extensions communicating with the interior of the body, a readily replaceable plug tapered to fit into the open end of the body a distance below one of its tubular extensions and stopping at a point above the other of said extensions, said plug having a constricted passage therethrough extending between said tubular extensions, and means in communication with said tubular extensions for indicating the difference in fluid pressure on opposite sides of the passage.

2. In an all glass flow meter, a hollow body having tubular extensions communicating with the interior of the body for connection in a fluid line and an intermediate section of which is provided with a stopper opening, a stopper closing said opening rotatable with respect to said body and having a fluid metering passage therethrough, one end of said passage being permanently in register with one of said extensions irrespective of the rotary position of said stopper and the other end being so located as to be brought into and out of register with the other extension by rotation of the stopper, and means for indicating the difference in fluid pressure on opposite sides of the metering passage.

3. In an all glass flow meter, a hollow body having a side opening with a tubular extension for connection in a fluid line and having end openings, one of which has a tubular extension for connection in a fluid line, readily replaceable rotatable means extending into the remaining end opening to close the same, said means having a metering passage therethrough one end of which can be brought into and out of register with one of said tubular extensions by rotation of said means and the other of which remains permanently in register with the other tubular extension, and means for indicating the difference in pressure on opposite sides of the metering passage.

4. In an all glass flow meter, a hollow body having end openings and a side opening, tubular branches in communication with one end opening and the side opening of the body, a readily replaceable hollow member for closing the other end opening, said member having a plurality of apertures through a wall thereof and being movable to selectively bring any aperture into register with the side opening to selectively restrict the flow of a fluid between said tubular branches, and means in communication with said tubular branches for indicating any difference in pressure therein.

5. In an all glass flow meter, a hollow body having tubular extensions in communication therewith for connection of the meter in a fluid line, a valve interposed in said body between its tubular extensions having metered passages in permanent communication with one of said tubular extensions and which by rotation of the valve relative to the body may be selectively brought into register with the other of said tubular extensions, and means in communication with said tubular extensions for indicating any difference in pressure therein.

VANCE E. HOFFMAN.
     EVERETT F. KELM.